P. C. ROWE.

Tobacco Pipe.

No. 1,840.

Reissued Dec. 27, 1864.

Witnesses.

Henry Morrison

C. L. Topliff

Inventor.

Philip C. Rowe per Munn & Co attorneys

N. PETERS, Photo-Lithographer, Washington, D. C.

UNITED STATES PATENT OFFICE.

CHARLES HOUGHTON, OF ROXBURY, MASSACHUSETTS, (TRUSTEE,)
ASSIGNEE OF PHILIP C. ROWE.

IMPROVED TOBACCO-PIPE.

Specification forming part of Letters Patent No. 43,526, dated July 12, 1864; Reissue No. 1,840, dated December 27, 1864.

*To all whom it may concern:*

Be it known that PHILIP C. ROWE, of Boston, in the county of Suffolk and State of Massachusetts, did invent an Improved Pocket Tobacco-Pipe, of which invention the following specification, taken in connection with the accompanying drawings, is a description sufficient to enable those skilled in the art to practice it.

This invention relates to the construction of pipes for smoking tobacco; and the principal object of the invention is the production of a pipe which, from its form and construction, shall admit of its being carried in the pocket when lighted and smoked when so carried without any danger of injury to the clothes or person of the smoker, and without obstruction to the free ingress of air to support combustion, the free egress of the volatile products of combustion, or the free passage of smoke to the mouth of the smoker.

In the peculiarity of construction giving such adaptability to the pipe consists, or mainly consists, this invention. It will, however, be understood that this construction does not prevent or impair the use of the pipe in the ordinary manner, the arrangement of the parts of the pipe tending rather to enhance the value of the pipe for smoking in the usual manner, as well as when carried in the pocket.

It is often desirable, when smoking a pipe, to have the hands free, and at the same time not to have to hold or suspend the pipe from the mouth. It is also often desirable, especially when walking, to temporarily stop smoking without "putting out" the pipe, and without the necessity of carrying the pipe in the hand. These advantages are obtained by this construction, as the pipe may be carried in the pocket and simultaneously smoked, or it may be temporarily carried in the pocket while lighted and when not being smoked, without detriment or inconvenience.

Figure 1:
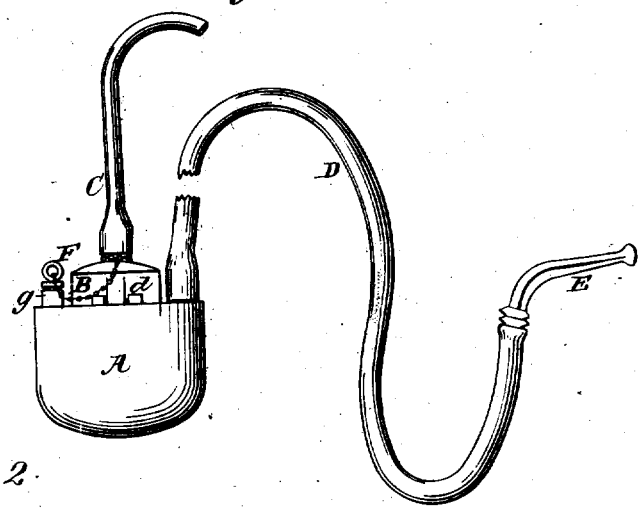
Figure 2:
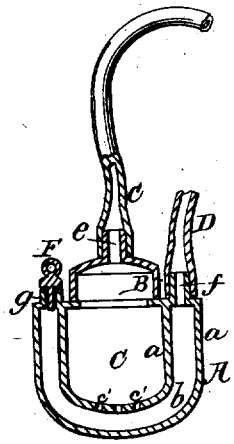
Figure 3:
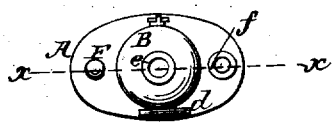

The drawings represent a pipe embodying this invention, Figure 1 showing a side view of the same, and Fig. 2 a vertical and central section taken on the line *x x* of Fig. 3, which is a top view of the pipe.

A denotes the main or outer wall of the pipe, made in any desired form, but preferably of a shape which shall best adapt it for occupying the vest-pocket. Within this outer wall, and at a little distance from it, or so as to leave a space, *b*, between it and the wall A, is an inner wall. This inner wall forms the tobacco-chamber *c*, which is surmounted by a cap or cover, B, connecting at *e* with an air-conduit, C, made of flexible or other suitable material. The cap or lid B may be hinged to the top of the pipe, as seen at *d*. An outlet, *f*, from the chamber *b*, is connected with the mouth-piece E by a long flexible or other tube, D.

In the bottom of the tobacco-chamber *c* perforations *c'* are made, these perforations connecting the tobacco-chamber *c* and the smoke-chamber *b*, thus permitting the smoke to be drawn from the chamber *c* through the holes *c'*, into and through the smoke-chamber *b*, and thence to the mouth of the smoker through the tube D; and it will be readily understood that when the pipe is placed in the pocket the smoking can be easily continued, the tube C, projecting from the pocket, supplying air to the lighted tobacco, and providing for the free escape of such volatile products of combustion as are not drawn through the tube D, the two tubes D and C also affording draft and flue tubes for regulating combustion, so that the lighted pipe can be carried in the pocket when not in use, the air or smoke space *b* between the walls *a a* in both cases preserving the pocket from any injurious or unpleasant effects from the heat in the tobacco-chamber *c*. A pipe thus constructed is desirable for smoking when carried in the hand on account of the protection of the outer surface of the pipe from the heat of the lighted tobacco.

Instead of constructing the pipe with the space *b*, the outer wall might be contiguous to the inner wall and made of material which was non-conductive of heat; or the wall of the tobacco-chamber might be made of non-heat-conducting material, or sufficiently thick in itself to protect the pocket, in either case having an air-tube, C, and smoke-tube E, to operate as described. The construction preferred, however, is substantially like that shown in the drawings. The chamber *b* serves also to receive any oil or fluid matter which may be produced while smoking; and the chamber is provided on one side with an opening, *g*, (closed by a stopper, F,) so that by removal of the stopper and blowing into the opening *g* (the tube D being also removed, if necessary) the chamber may be cleansed from impurities.

What is claimed is—

A smoking-pipe having its parts constructed and arranged in the manner and for the purpose substantially as described.

CHS. HOUGHTON,
*Trustee.*

Witnesses:
V. A. MESSINGER,
ALBERT F. HALL.